US012775536B2

(12) United States Patent
Lai et al.

(10) Patent No.: US 12,775,536 B2
(45) Date of Patent: Oct. 27, 2026

(54) METHOD OF GENERATING TEST SEQUENCE OF ECU AND TEST SYSTEM THEREOF

(71) Applicant: Fulian Precision Electronics (Tianjin) Co., LTD., Tianjin (CN)

(72) Inventors: Yun-Sheng Lai, New Taipei (TW); Chia-Cheng Su, New Taipei (TW); Chien-Wei Chiu, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 64 days.

(21) Appl. No.: 19/016,161

(22) Filed: Jan. 10, 2025

(65) Prior Publication Data

US 2026/0147681 A1 May 28, 2026

(30) Foreign Application Priority Data

Nov. 28, 2024 (CN) ......................... 202411728203.2

(51) Int. Cl.
*G06F 11/263* (2006.01)
*G06F 11/22* (2006.01)

(52) U.S. Cl.
CPC ........ *G06F 11/263* (2013.01); *G06F 11/2236* (2013.01)

(58) Field of Classification Search
CPC ........................... G06F 11/263; G06F 11/2236
See application file for complete search history.

(56) References Cited

U.S. PATENT DOCUMENTS 6,252,891 B1 6/2001 Perches
2010/0180260 A1* 7/2010 Chikkadevaiah ... G06F 11/3698 717/125
2012/0259576 A1* 10/2012 Thulasidasan ...... G06F 11/3684 702/123
2022/0019522 A1 1/2022 Jaros et al.
2022/0237500 A1* 7/2022 Dinh ........................ G06N 5/01
2022/0253375 A1* 8/2022 Rivoir .................. G01R 31/287
2024/0241816 A1 7/2024 Kambadahalli Gangappa et al.
2025/0053500 A1* 2/2025 Barreto ............... G06F 11/3684

* cited by examiner

*Primary Examiner* — Thien Nguyen
(74) *Attorney, Agent, or Firm* — ScienBiziP, P.C.

(57) ABSTRACT

A method of generating a test sequence includes: obtaining several test items of an ECU, and obtaining a dependency relationship and an exclusive situation relationship among the test items; outputting the test items to a test monitor device; receiving test resources required by each of the test items, which are obtained by the test monitor device; generating a test sequence based on the dependency relationship, the exclusive situation relationship, and the test resources required by each of the test items; outputting the test sequence to a test execution device. The test sequence indicates an execution timestamp of each test item, which indicates an execution starting time. The test execution device executes the test items based on the test sequence. A total execution time duration of testing is significantly reduced. An utilization rate of test resources and the efficiency of test are improved. A test system is also provided.

16 Claims, 12 Drawing Sheets

METHOD OF GENERATING TEST SEQUENCE OF ECU AND TEST SYSTEM THEREOF

TECHNICAL FIELD

The present application generally relates to test technology, and particularly to a method of generating a test sequence of an electronic control units (ECU) and a test system thereof.

BACKGROUND

While manufacturing electronic control units (ECUs) used in vehicles, a key step of controlling product quality is a test of the ECU. However, there are problems in a test method in a related art, such as time consumption for the test, a low utilization rate of test resources, and an inflexibility in test sequence.

There is room for improvement in the art.

BRIEF DESCRIPTION OF THE DRAWINGS

Implementations of the present application will now be described, by way of example only, with reference to the attached figures.

DETAILED DESCRIPTION

The following clearly describes the technical solution in embodiments of this application with reference to the accompanying drawings in the embodiments of the application.

It may be understood that the connection relationship described in this application is a direct or indirect connection. For example, that A is connected to B may not only be that A is directly connected to B, but also be that A is indirectly connected to B by using one or more other electrical components. For example, it may be that A is directly connected to C, and C is directly connected to B. In this way, A is connected to B by using C. it may be further understood that "A is connected to B" described in this application may be that A is directly connected to B, or may be that A is indirectly connected to B by using one or more other electrical components.

In descriptions of this application, unless otherwise specified, "/" means "or". For example, A/B may represent A or B. The term "and/or" in this application describes only an association relationship between associated objects and indicates that there may be three relationships. For example, A and/or B may represent the following three cases: Only A exists, both A and B exist, and only B exists.

In the descriptions of the application, the words such as "first" and "second" are used to distinguish between different objects, and do not limit quantities and execution sequences. In addition, the words such as "first" and "second" do not necessarily limit a definite difference. In addition, terms "include" and "have", and any variant thereof are intended to cover the non-exclusive inclusion.

While manufacturing electronic control units (ECUs) used in vehicles, a key step of controlling product quality is a test of the ECU. However, there are problems in a test method in a related art, such as time consumption for the test, a low utilization rate of test resources, and an inflexibility in test sequence.

Figure 1:
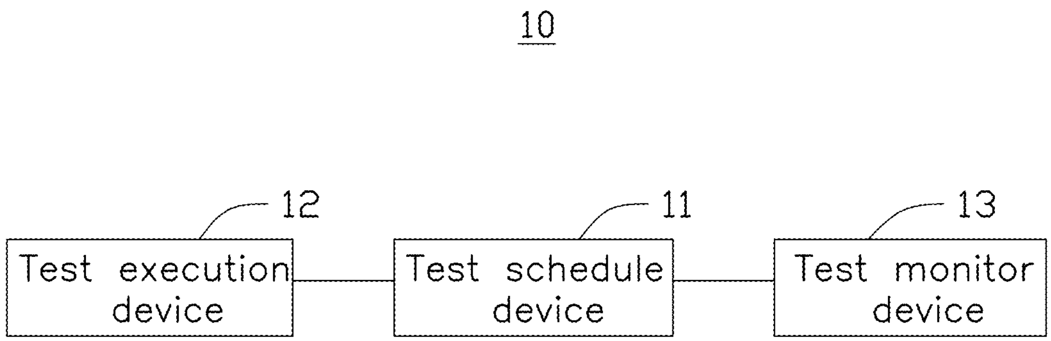
FIG. 1 is a diagram illustrating an embodiment of a test system for an ECU according to the present application.

Specifically, referring to FIG. 1, FIG. 1 shows a test system 10 of the ECU. The test system 10 includes a test schedule device 11, a test execution device 12, and a test monitor device 13. All of the test schedule device 11, the test execution device 12, and the test monitor device 13 may be an electronic device with a processor and a non-transitory computer readable storage medium. The non-transitory computer readable storage medium stores computer programs, which is executed by the processor to implement functions of the test schedule device 11, the test execution device 12, and the test monitor device 13.

The test schedule device 11 is configured to generate a test sequence of the ECU and output the test sequence to the test execution device 12. The test sequence may include a plurality of test items, which are required to be executed, and an execution timestamp of each of the plurality of test items. The execution timestamp is configured to indicate a starting time of executing a corresponding test item.

The test execution device 12 is configured to test a to-be-tested ECU based on the test sequence. In detail, the test execution device 12 sequentially executes the test items based on an order of the starting times indicated by the execution timestamps of the plurality of test items, for accomplishing a test process of the ECU.

The test monitor device 13 is configured to execute each of the plurality of test items, and obtain test resources required by each of the plurality of test items. The test resources may include a usable occupancy rate of a processor, an amount of an available memory, and an execution time duration, and so on. The test schedule device 11 may generate the test sequency based on the test resources, a dependency relationship, and an exclusive situation relationship.

The working process of the test system 10 will described as blow.

Firstly, the test schedule device 11 receives the plurality of the test items, and the dependency relationship and the exclusive situation relationship among the plurality of the test items. The dependency relationship may include a dependent relationship and a depended relationship among the plurality of test items, the exclusive situation relationship may include an exclusion relationship and a non-mutual exclusive relationship among the plurality of test items. For example, when there is the dependent relationship between a test item A and a test item B, it indicates that the test item A needs to be executed after the test item B has been completely executed. For example, when there is the depended relationship between the test item A and the test item B, it indicates that the test item B needs to be executed after the test item A has been completely executed. For example, when there is the mutual exclusive relationship between the test item A and the test item B, it indicates that the test item A and the test item B can not be executed at the same time. For example, there is the non-mutual exclusive relationship between the test item A and the test item B, it indicates that the test item A and the test item B can be executed at the same time. In other words, when there is the dependent relationship or the depended relationship between the test item A and the test item B, it must exist the mutual exclusive relationship between the test item A and the test item B.

In some embodiments, the test schedule device 11 may receive the plurality of test items, the dependency relationship, and the exclusive situation relationship, through an input apparatus. The input apparatus may include collection apparatuses of text, action, and audio, such as a keyboard, a mouse, a microphone, a camera, and so on, but not limited.

In some embodiments, the test schedule device 11 may receive the plurality of test items, the dependency relationship, and the exclusive situation relationship, in a communication connection manner. The communication connection may include a wireless communication connection or a wired communication connection.

Secondly, the test schedule device 11 may output the plurality of test items to the test monitor device 13. The test monitor device 13 may execute all of the plurality of test items in the predefined ECU. While executing all of the plurality of test items, test resources corresponding to each test item are collected and outputted to the test schedule device 11. For example, while executing all of the plurality of test items, a usable occupancy rate of a processor, an amount of available memory, and an execution time duration of each of the plurality of test items, and so on are collected.

After that, the test schedule device 11 generates the test sequence based on the dependency relationship, the exclusive situation relationship, and the test resources, and outputs the test sequence to the test execution device 12.

Then, the test execution device 12 executes the plurality of test items in the to-be-tested ECU based on the execution timestamp corresponding to each of the test items in the test sequence, for accomplishing the process of testing the ECU.

Figure 2:
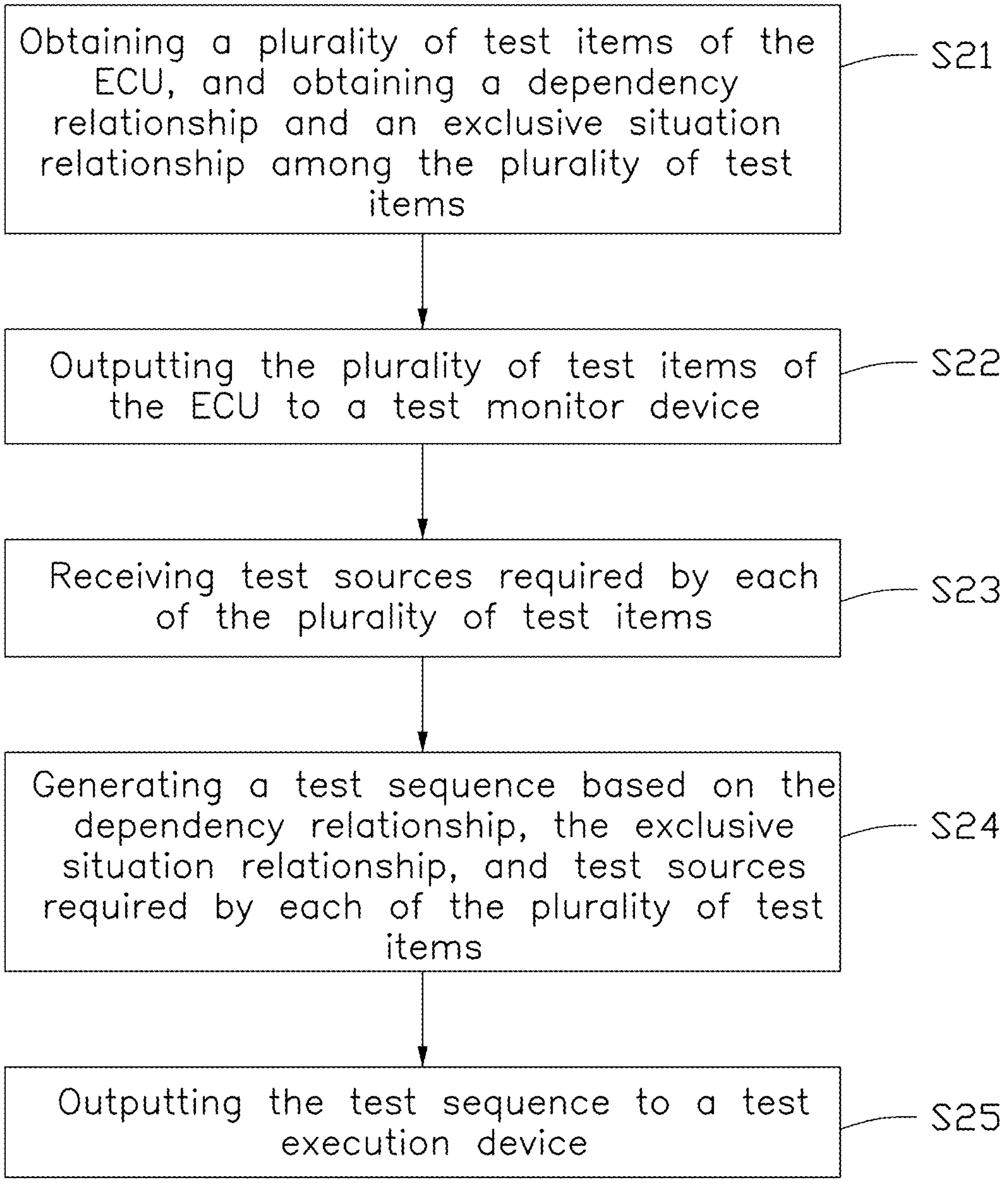
FIG. 2 is a flowchart illustrating an embodiment of a method of generating a test sequence of an ECU according to the present application.

Referring to FIG. 2, FIG. 2 shows a flowchart of a method of generating a test sequence of the ECU. The method is implemented by the test schedule device 11. The method includes the following steps.

In block S21, a plurality of test items of the ECU is obtained, and a dependency relationship and an exclusive situation relationship in the plurality of test items are obtained.

For example, the plurality of test items of the ECU may include a first to tenth test items T1-T10. The depended relationship and the mutual exclusive relationship among the first to tenth test items T1-T10 are shown as the below table 1.

TABLE 1

| Depended relationship and Mutual exclusive relationship among the test items | | |
|---|---|---|
| Test item | Dependency relationship | Exclusive situation relationship |
| T1 | None | T3 |
| T2 | T1 | None |
| T3 | T1 | T1 |
| T4 | T2 | T5 T6 |
| T5 | T3 | T4 |
| T6 | T4 | T4 |
| T7 | None | None |
| T8 | T7 | T9 |

TABLE 1-continued

| Depended relationship and Mutual exclusive relationship among the test items | | |
|---|---|---|
| Test item | Dependency relationship | Exclusive situation relationship |
| T9 | T8 | T8 |
| T10 | T9 | None |

Using the first test item T1 as an example, there is no depended relationship between the first test item T1 and the second to tenth test items T2-T10, in other words, the first test item T1 does not depend on the second to tenth test items T2-T10. Before executing the first test item T1, no test item needs to be firstly executed. There is the mutual exclusive relationship between the first test item T1 and the third test item T3, therefore the first test item T1 and the third test item T3 cannot be executed at the same time.

Using the second test item T2 as an example, there is a depended relationship between the second test item T2 and the first test item T1, it indicates that the second test item T2 is depended on the first test item T1. Before executing the second test item T2, the first test item T1 needs to be completely executed. There is no exclusive relationship related to the second test item T2. It indicates that, besides the dependent or depended relationship, the second test item T2 may be executed with the test items T3-T10 at the same time.

In block S22, the plurality of test items of the ECU is outputted to the test monitor device 13.

The test schedule device 11 outputs the plurality of test items to the test monitor device 13 in the communication connection manner. The communication connection may include a wireless communication connection or a wired communication connection, but not limited.

In block S23, the test resources of each of the plurality of test items are received.

When receiving the plurality of test items, the test monitor device 13 may execute all of the plurality of test items in the predefined ECU. While executing all of the plurality of test items, test resources corresponding to each test item are collected and outputted to the test schedule device 11, therefore the test schedule device 11 may receive the test resources required by each of the plurality of test items.

For example, the test resources received by the test schedule device 11, which are required by each of the plurality of test items, are shown as below table 2.

TABLE 2

| Test resources required by each of the test items | | | |
|---|---|---|---|
| Test item | Amount of the available memory | Usable occupancy rate of the processor | Execution time duration |
| T1 | 50 | 10 | 10 |
| T2 | 60 | 15 | 20 |
| T3 | 40 | 20 | 15 |
| T4 | 30 | 10 | 25 |
| T5 | 45 | 12 | 30 |
| T6 | 50 | 18 | 20 |
| T7 | 35 | 10 | 10 |
| T8 | 55 | 15 | 15 |
| T9 | 50 | 20 | 20 |
| T10 | 40 | 25 | 25 |

A unit of the amount of the available memory is MB, a unit of the usable occupancy rate of the processor is percentage, and a unit of the execution time duration is seconds.

In block S24, a test sequence is generated based on the dependent relationship, the exclusive situation relationship, and the test resources required by each of the plurality of test items.

The test sequence may be indicated as a set of the plurality of test items and the execution timestamps of the plurality of test items. For example, the test sequence may be indicated as [T1:0, T2:10, T3:30, T4:45, T5:70, T6:100, T7:120, T8:130, T9:145, T10:165]. In the test sequence, the execution timestamp of the first test item T1 is 0 seconds, it means that the first test item T1 is executed at 0 seconds. The execution timestamp of the second test item T2 is 10 seconds, it means that the first test item T1 is executed at 10 seconds. Similarly, the execution timestamp of the tenth test item T10 is 165 seconds, it means that the tenth test item T10 is executed at 165 seconds.

Specifically, the test schedule device 11 may establish a directed graph based on the dependent relationship, and establish a candidate queue based on nodes in the directed graph. The candidate queue includes all of the plurality of test items.

At a timepoint of the execution timestamp, the test schedule device 11 adds at least one of the plurality of test items into a simulation test set, which are satisfied with a predefined condition, and removes corresponding test items in the candidate queue.

The predefined condition may include a first condition and a second condition. When a test item satisfied with one of the first condition and the second condition, it indicates that the test item satisfied with the predefined condition.

First condition: the test item does not depend on others of the plurality of test items, there is no mutual exclusive relationship between the test item and the others test items in the simulation test set, and the test resources required by the test item are less than or equal to a rest available resources.

Second condition: at least one prior test item, which the test item is depended on, has been completely executed, there is non-mutual exclusive relationship between the test item and the others test items in the simulation test set, and the test resources required by the test item are less than or equal to the rest available resources.

The execution timestamp may include N execution timestamps, which are a first to Nth execution timestamps. The starting timepoint indicated by the Nth execution timestamp is later than the starting time indicted by the (N−1)th execution timestamp. The starting timepoint indicated by each of the N execution timestamps indicates a timepoint of a latest test item, which has been executed. The rest available resources is a difference between total test resources of the test execution device 12 and total test resources of the test items in the simulation test set.

The test schedule device 11 may execute all of the test items in the simulation test set. While executing, the test schedule device 11 may update the rest available resources. In detail, when at least one of the plurality of test items is added into the simulation test set, the test schedule device 11 may minus the test resources required by the added test item from the current rest available resources. When at least one of the test items in the simulation test set has been completed executed, the test schedule device 11 may add the test resources required by the executed test item with the current rest available resources.

When at least one of the test items in the simulation test set has been completed executed, the test schedule device 11 serves the current time as the starting timepoint indicated by a next execution timestamp, removes the executed test item from the simulation test set, and repeats to add at least one of the rest of the plurality of test items in to the simulation test set, which is satisfied with the predefined condition. Similarly, the test schedule device 11 may record each execution timestamp and the corresponding test item in the simulation test set. Therefore, a corresponding relationship between the execution timestamps and the test item in the simulation test set is obtained, and the test sequence is obtained.

In block S25, the test sequence is outputted to the test execution device 12.

The test execution device 12 executes the plurality of test items in the to-be-tested ECU based on the test sequence. Specifically, the test execution device 12 may start to count time when beginning to execute the test item, and execute a next test item when an accumulated time reaches a starting time indicated by the execution timestamp corresponding to a next test item. Similarly, the process of testing the to-be-tested ECU is accomplished.

Figure 3:
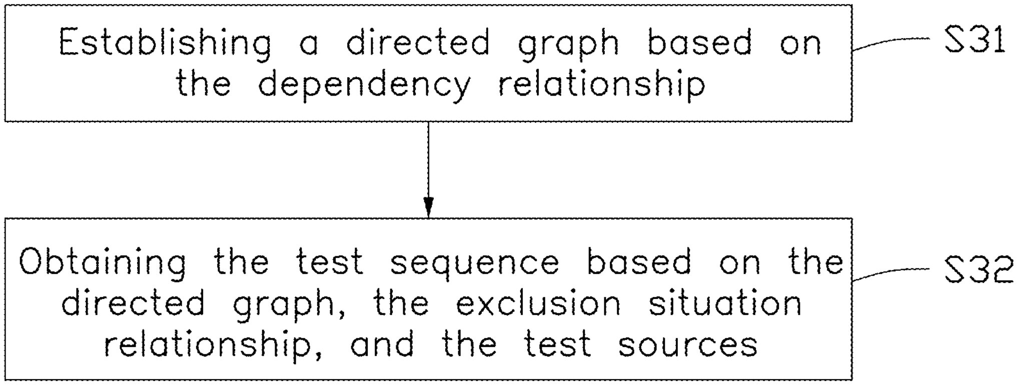
FIG. 3 is a detail flowchart illustrating an embodiment of the block S22 of the flowchart in FIG. 2 according to the present application.

Referring to FIG. 3, FIG. 3 shows a detail flowchart of the block S22. The block S22 further includes the following steps.

In block S31, the directed graph is established based on the dependent relationship.

Each node in the directed graph represents one test item. A directed edge between two nodes represents a depended relationship between the two test items. For example, as shown in the table 1, the second test item T2 is depended on the first test item T1, the directed edge pointed from the node corresponding to the first test item T1 to the node corresponding to the second test item T2. Therefore, the directed edges of the directed graph are established based on the depended relationship shown in the table 1.

In block S32, the test sequence is established based on the directed graph, the exclusive situation relationship, and the test sources.

Figure 4:
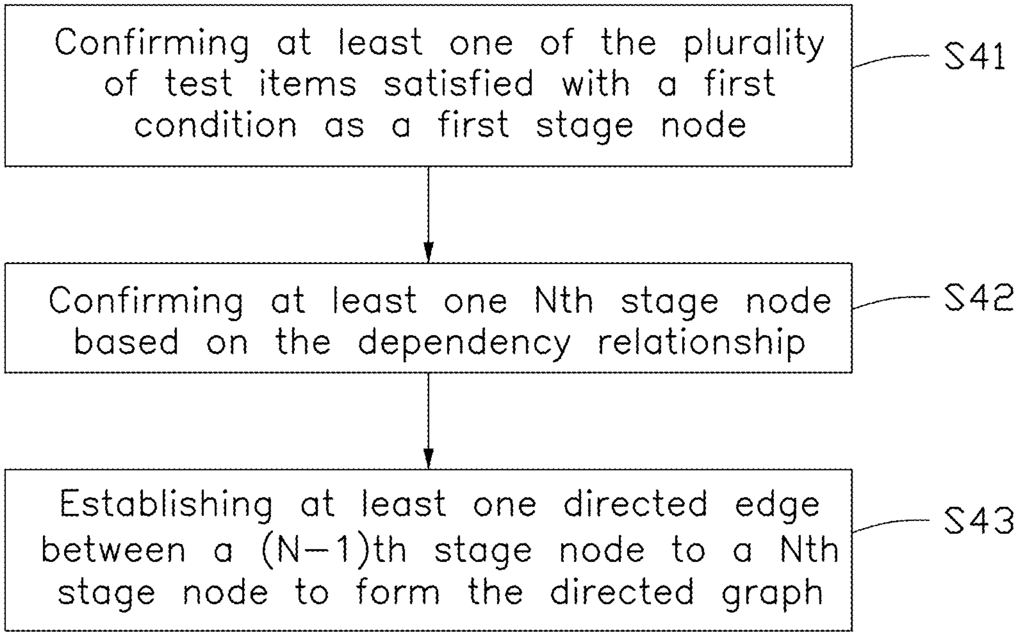
FIG. 4 is a detail flowchart illustrating an embodiment of the block S31 of the flowchart in FIG. 2 according to the present application.

Referring to FIG. 4, FIG. 4 shows a detail flowchart of the block S31. The block S31 further includes the following steps.

In block S41, at least one test item satisfied with the first condition is confirmed as a first stage node.

The first predefined condition may include the at least one test item independent from others of the plurality of test items. For example, according to the dependent relationship shown in the table 1, the first test item T1 and the seventh test item T7 independent from others of the plurality of test items. Therefore, the first test item T1 and the seventh test item T7 serve as the first stage nodes in the directed graph.

In block S42, Nth stage nodes are confirmed based on the dependent relationship.

The at least one test item corresponding to the at least one Nth stage node is depended on the at least one test item corresponding to the at least one (N−1)th stage node. N is an integer, being larger than 2.

In block S43, at least one directed edge between the Nth stage node and the (N−1)th stage node is established to form the directed graph.

Due to the at least one test item corresponding to the at least one Nth stage node is depended on the at least one test item corresponding to the at least one (N−1)th stage node, the directed edge between the at least one Nth stage node and the at least one (N−1)th stage node is established. According to the dependent relationship of all of the nodes, the directed edges of all of the nodes are established to form the directed graph.

Figure 5:
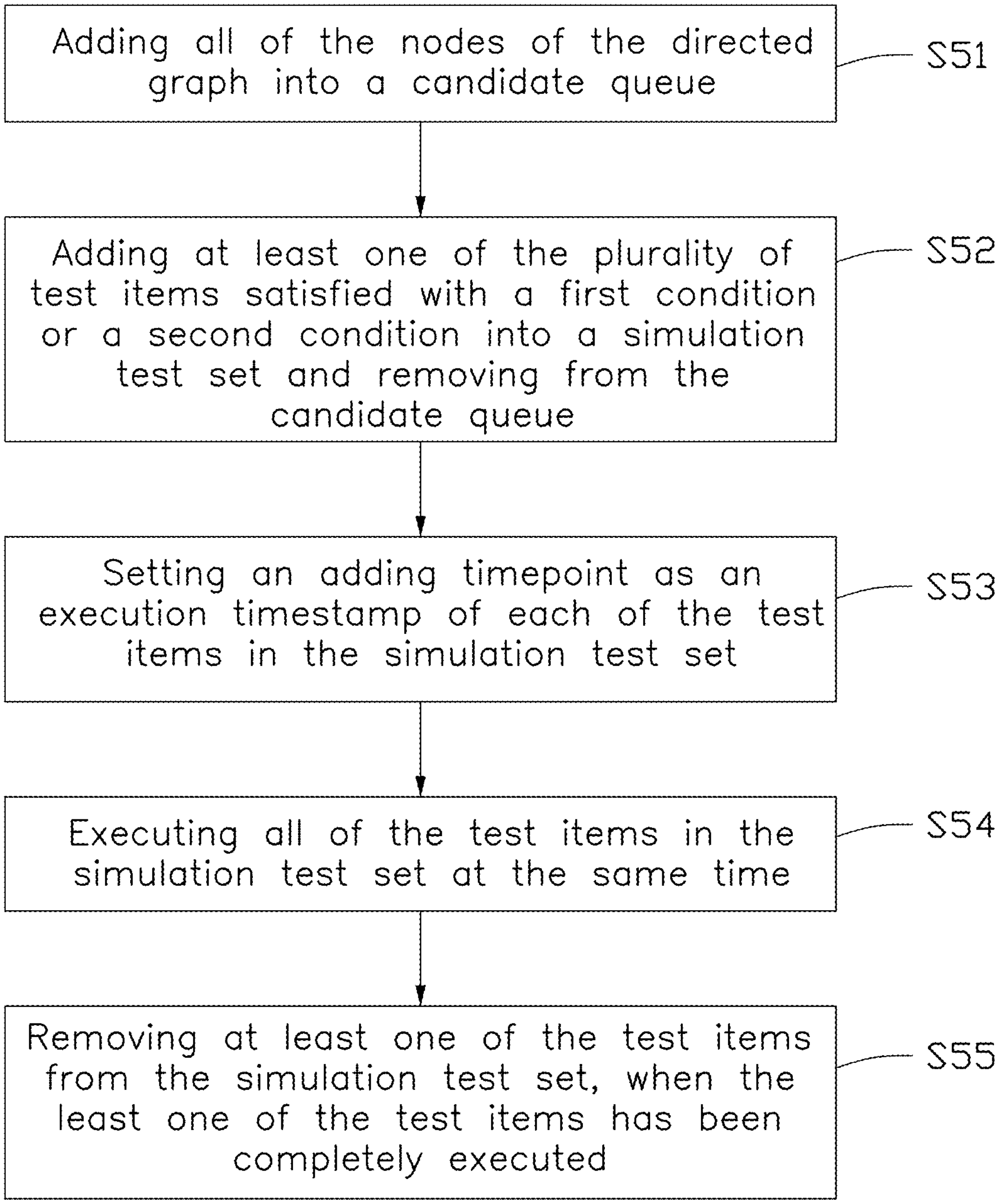
FIG. 5 is a detail flowchart illustrating an embodiment of the block S32 of the flowchart in FIG. 2 according to the present application.

Referring to FIG. 5, FIG. 5 shows a detail flowchart of the block S32. The block S32 further include the following steps.

In block S51, all of the nodes in the directed graph are added into the candidate queue.

At an initial state, the candidate queue is empty. In that means, there is no test item in the candidate queue. After the nodes of the directed graph are added into the candidate queue, the candidate queue includes all of the plurality of test items. For example, the candidate queue includes the first to tenth test items T1-T10.

In block S52, at least one of the plurality of test items satisfied with the first condition or the second condition is added into the simulation test set, and removed from the candidate queue.

At an initial state, the simulation test set is empty. In that means, there is no test item in the simulation test set. The first condition and the second are recited as the foregoing description, no detail is described. For example, when the first test item T1 and the seventh test item T7 are satisfied with the first condition, the first test item T1 and the seventh test item T7 are added into the simulation test set and removed from the candidate queue. Thus, the simulation test set includes the first test item T1 and the seventh test item T7. The candidate queue includes the second to sixth test items T2-T6 and the eighth to tenth test items T8-T10.

In block S53, an adding timepoint is set as the execution timestamp of each of the test items in the simulation test set.

For example, at 0 seconds, the first test item T1 and the seventh test item T7 are satisfied with the first condition, the adding timepoint of the first test item T1 and the seventh test item T7 is set as the execution starting time indicated by the execution timestamp of the first test item T1 and the seventh test item T7.

In block S54, all of the test items in the simulation test set are executed at the same time.

In block S55, at least one of the test items, is removed from the simulation test set, when the at least one of the test times has been completely executed.

For example, as shown in the table 2, the execution time duration each of the first test item T1 and the seventh test item T7 is 10 seconds, therefore the first test item T1 and the seventh test item T7 have been completely executed after the 10 seconds and are removed from the simulation test set.

After the block S55, the procedure returns to the block S52, until all of the test items have been completely executed and are removed from the simulation test set.

At this time, the second and third test item T2-T3 are depended on the first test item T1, and the eighth test item T8 is depended on the seventh test item T7. After the first test item T1 and the seventh test item T7 have been completely executed, there is the non-mutual exclusive relationship among the second test T2, the third test item T3, and the eighth test item T8, and the simulation test set is empty, thus there also is the non-mutual exclusive relationship among the second test T2, the third test item T3, the eighth test item T8, and the test items in the simulation test set. Further, the total test resources of the second test T2, the third test item T3, and the eighth test item T8 is less than or equal to the rest available test resources. Therefore, the second test T2, the third test item T3, and the eighth test item T8 are satisfied with the second condition, which are added in to the simulation test set and are removed from the candidate queue. The execution timestamp of the second test T2, the third test item T3, and the eighth test item T8 are set as the adding timepoint, which is 10 seconds.

Similarly, the execution timestamp of each of the plurality of test items are obtained, for forming the test sequence.

The method of generating the test sequence is described below with reference to a specified embodiment. The method of generating the test sequence is described by using the first to tenth test items T1-T10, the table 1, and the table 2, which records the dependent relationship, the exclusive situation relationship, and the test resources among the first to tenth test items T1-T10, as an example.

Firstly, according to the block S21, the first to tenth test items T1-T10 are obtained, and the dependent relationship and the exclusive situation relationship among the first to tenth test items T1-T10 are also obtained.

Secondly, according to the block S22, the first to tenth test items T1-T10 are outputted to the test monitor device 13.

Thirdly, according to the block S23, the test monitor device 13 are sequentially executed the first to tenth test items T1-T10 in the predefined ECU, records the test resources of each of the first to tenth test items T1-T10, which includes the usable occupancy rate of a processor, the amount of an available memory, and the execution time duration while executing a corresponding test item, and outputs the test resources of each of the first to tenth test items T1-T10 to the test schedule device 11.

Figure 6:
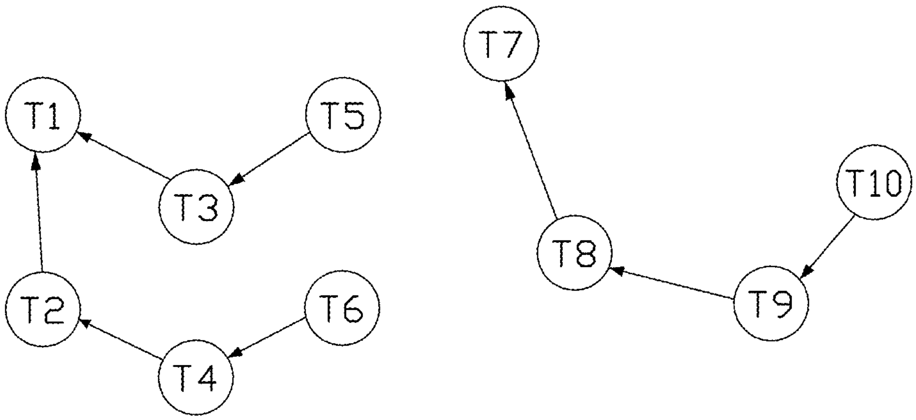
FIGS. 6-12 are diagram illustrating an embodiment of a principle according to the present application.

After receiving the test resources of each of the first to tenth test items T1-T10, according to the blocks S41 to S43 and the table 1, the directed graph is established. As shown in FIG. 6, each node in the directed graph corresponds to one of the first to tenth test items T1-T10. There are two first stage nodes corresponding to the first test item T1 and the seventh test item T7. The second stage nodes corresponding to others of the first to tenth test items T1-T10 are depended on the first stage nodes. There are three second stage nodes corresponding to the second test T2, the third test item T3, the eighth test item T8. Similarly, there are three third stage nodes. The third stage node related to the second stage node corresponding to the second test item T2 corresponds the fourth test item T4, the third stage node related to the second stage node corresponding to the third test item T3 corresponds the fifth test item T5, the third stage node related to the second stage node corresponding to the eighth test item T8 corresponds the ninth test item T9. There are two fourth stage nodes. The fourth stage node related to the third stage node corresponding to the fourth test item T4 corresponds to the sixth test item T6, and the fourth stage node related to the third stage node corresponding to the ninth test item T9 corresponds to the tenth test item T10.

The directed edges between the Nth stage node and the (N−1)th stage node are established. For example, one of the directed edges is from the first test item T1 to the second test item T2, one of the directed edges is from the first test item T1 to the third test item T3. Similarly, the directed graph is established based on the directed edges.

Then, according to the block S51, the test items corresponding to the nodes of the directed graph are added into the candidate queue. Before adding, there is no test item in the candidate queue. After adding, the candidate queue includes the first to tenth test items T1-T10.

According to the block S52, at least one of the first to tenth test items T1-T10 satisfied with the first condition or the second condition is added in to the simulation test set. Before adding, there is no test item in the simulation test set. The adding timepoint is 0 seconds, the rest available resources are a total test resources of the test schedule device 11. Using the amount of the available memory of the test schedule device 11 as an example, at the adding timepoint, the rest available resources include the amount of the available memory at 512 MB and the usable occupancy rate of the processor at 100%.

Figure 7:
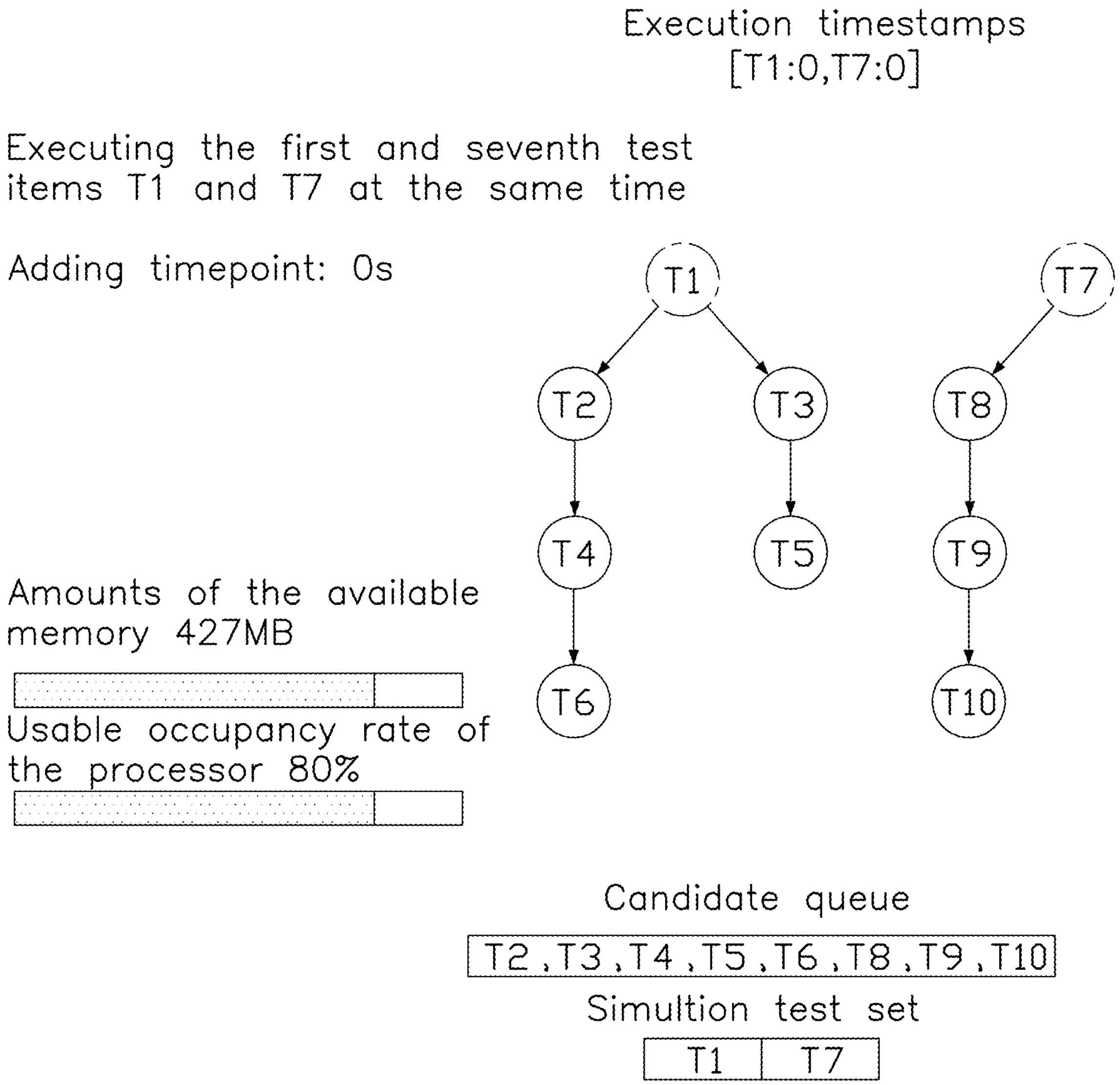

As shown in FIG. 7, the first and seventh test item T1 and T7 are satisfied with the first condition, which are added into the simulation test set and are removed from the candidate queue. According to the block S53, the execution timestamp each of the first and seventh test item T1 and T7 is set as the adding timepoint, which is 0 seconds.

According to the block S54, the test items in the simulation test set are executed at the same time, thus the first and seventh test items T1 and T7 are executed at the same time. While executing, the rest available resources are updated. The updated available resources include the amount of the available memory at 427 MB and the usable occupancy rate of the processor at 80%. After the first and seventh test items T1 and T7 have been completely executed, according to the block S55, the test resources are released, the first and seventh test items T1 and T7 are removed from the simulation test set. At this time, the rest resources include the amount of the available memory at 512 MB and the usable occupancy rate of the processor at 100%.

Figure 8:
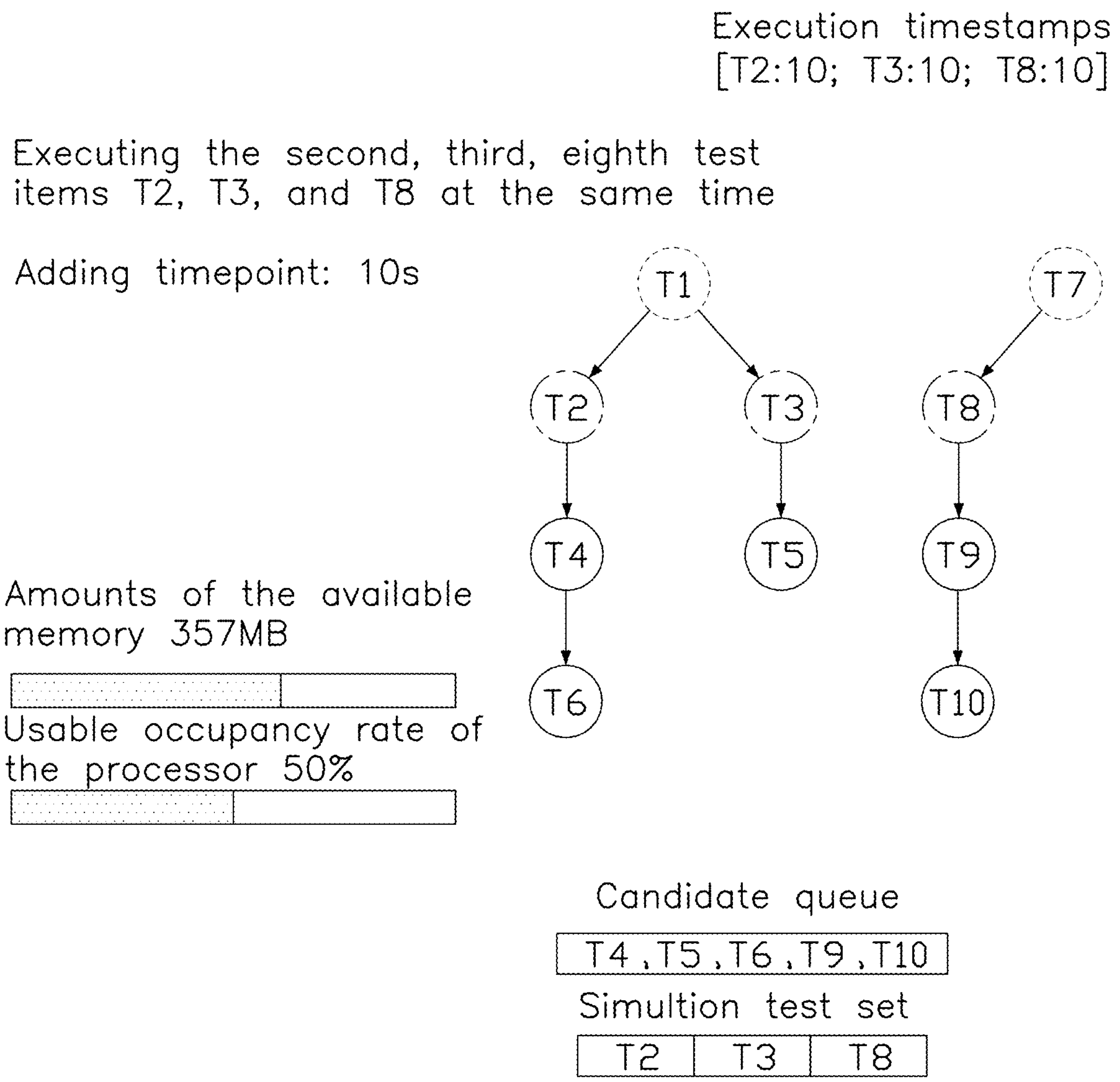

The procedure returns to block S52, as shown in FIG. 8, at this time, the second, third, and eighth test items T2, T3, and T8 are satisfied with the second condition, which are added in to the simulation test set and removed from the candidate queue. Besides, the execution timestamp of each of the second, third, and eighth test items T2, T3, and T8 is set as the adding timepoint, which is 10 seconds.

While executing the second, third, and eighth test items T2, T3, and T8, the rest resources is updated, the updated rest resources include the amount of the available memory at 357 MB and the usable occupancy rate of the processor at 50%. Due to the execution time duration of the second test item T2 is different from the execution time duration of the third and eighth test items T3 and T8, after the third and eighth test items T3 and T8 have been completely executed, the second test item T2 is still being executed. Therefore, according to the block S55, the test resources corresponding to the third and eighth test items T3 and T8 are released, the third and eighth test items T3 and T8 are removed from the simulation test set. At this time, the rest resources includes the amount of the available memory at 452 MB and the usable occupancy rate of the processor at 85%. The total execution time duration is 25 seconds.

Figure 9:
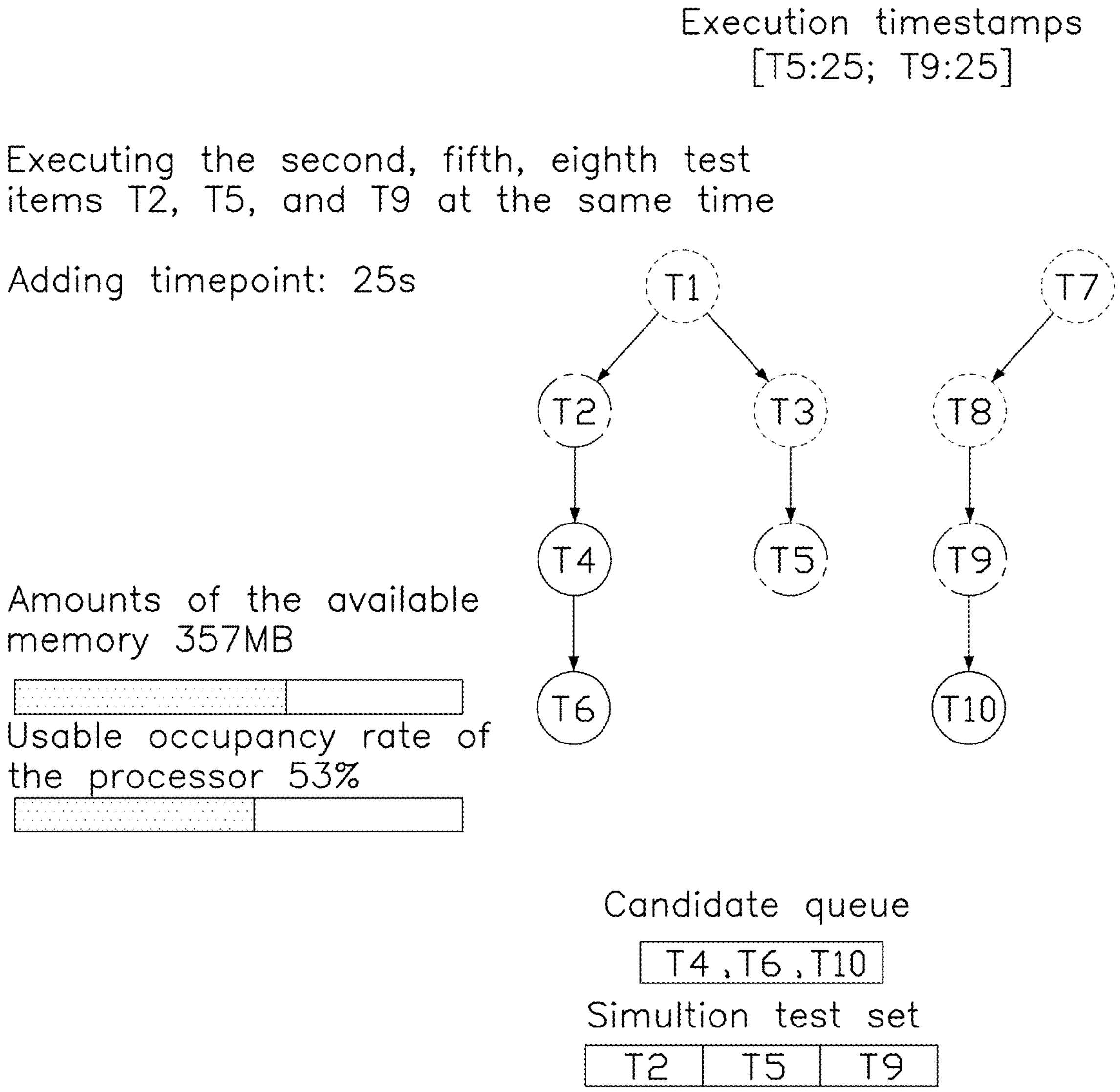

The procedure turns to the blocks S52. As shown in FIG. 9, at this time, the fifth and ninth test items T5 and T9 are satisfied with the second condition, which are added into the simulation test set and removed from the candidate queue. Besides, according to the block S53, the execution timestamp of each of the fifth and ninth test items T5 and T9 is set as the adding timepoint, which is 25 seconds.

While executing the fifth and ninth test items T5 and T9, the second test item T2 is still executed, and the rest resources are updated. The updated rest resources include the amount of the available memory at 357 MB and the usable occupancy rate of the processor at 53%. After the second test item T2 has been completely executed, according to the block S55, the test resources corresponding to the second test item T2 are released, and the second test item T2 is removed from the simulation test set. At this time, the rest resources include the amount of the available memory at 417 MB and the usable occupancy rate of the processor at 68%. The total execution time duration is 30 seconds.

At this time, there is the mutual exclusive relationship between the fourth test item T4 and the fifth test item T5, thus the fourth test item T4 is not satisfied with the first or second conditions, and is not added into the simulation test set.

Continuing executing the fifth and ninth test items T5 and T9, the ninth test item T9 has been completely executed before the fifth test item T5. According to the block S55, the test resources corresponding to the ninth test item T9 are released, and the ninth test item T9 is removed from the simulation test set. At this time, the rest resources include the amount of the available memory at 467 MB and the usable occupancy rate of the processor at 88%. The total execution time duration is 45 seconds.

Figure 10:
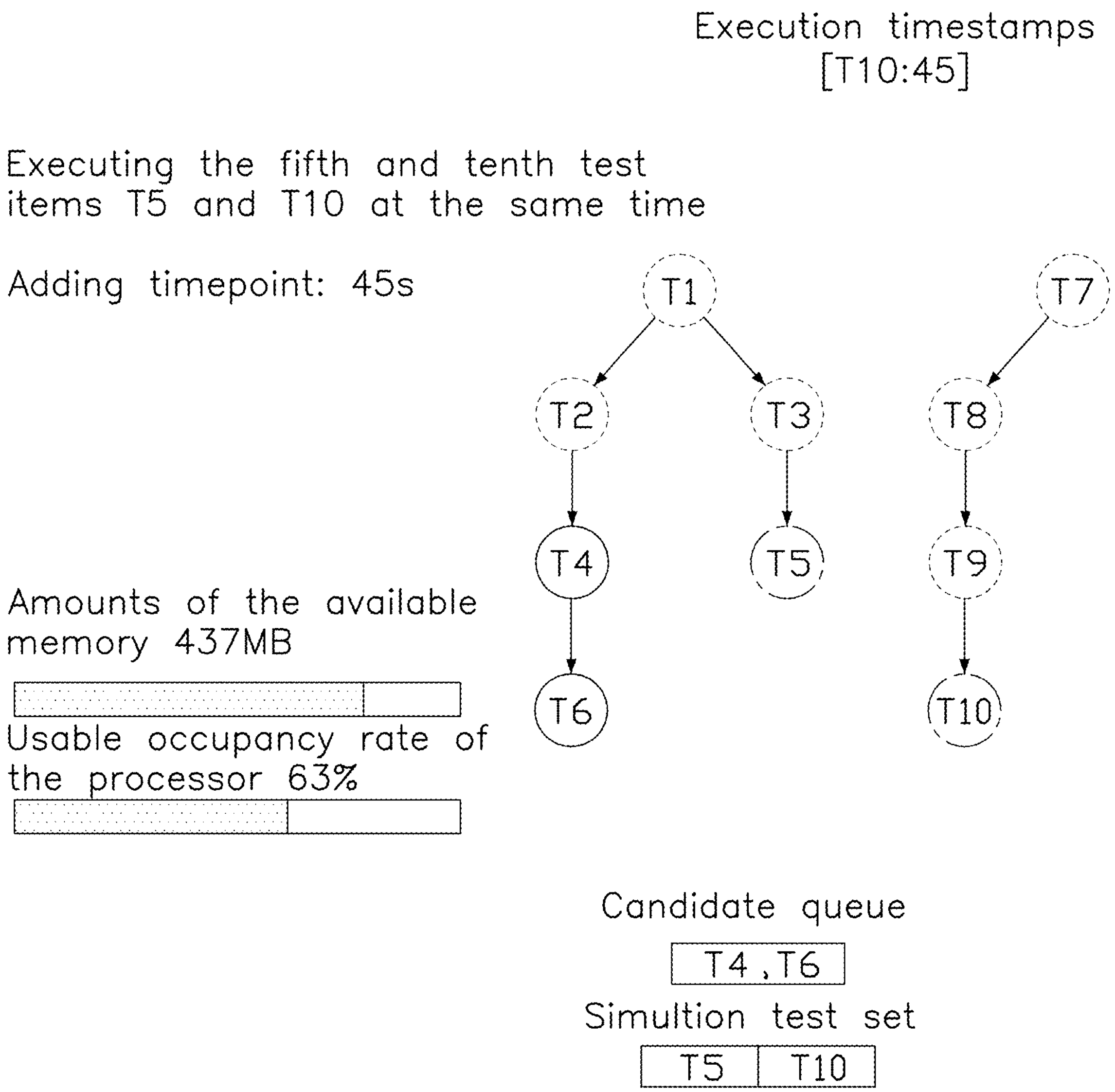

The procedure turns to the blocks S52. As shown in FIG. 10, at this time, the tenth T10 is satisfied with the second condition, which is added into the simulation test set and removed from the candidate queue. Besides, according to the block S53, the execution timestamp of the tenth test item T10 is set as the adding timepoint, which is 45 seconds.

While executing the tenth test item T10, the fifth test item T5 is still executed, and the rest resources are updated. The updated rest resources include the amount of the available memory at 427 MB and the usable occupancy rate of the processor at 63%. After the fifth test item T5 has been completely executed, according to the block S55, the test resources corresponding to the fifth test item T5 are released, and the fifth test item T5 is removed from the simulation test set. At this time, the rest resources include the amount of the available memory at 472 MB and the usable occupancy rate of the processor at 75%. The total execution time duration is 60 seconds.

Figure 11:
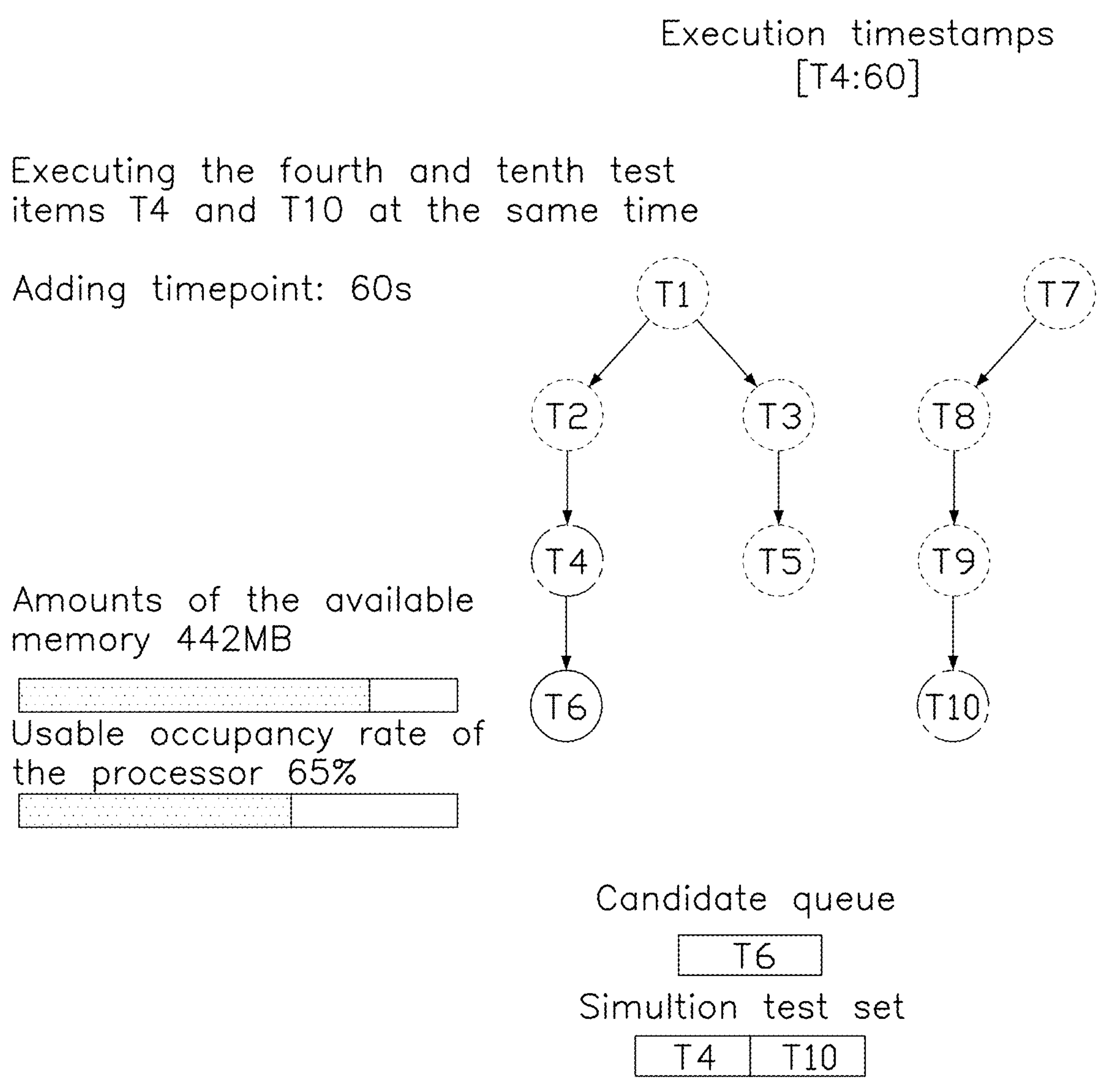

The procedure turns to the blocks S52. As shown in FIG. 11, at this time, the fourth T4 is satisfied with the second condition, which is added into the simulation test set and removed from the candidate queue. Besides, according to the block S53, the execution timestamp of the fourth test item T4 is set as the adding timepoint, which is 60 seconds.

While executing the fourth test item T4, the tenth test item T10 is still executed, and the rest resources are updated. The updated rest resources include the amount of the available memory at 442 MB and the usable occupancy rate of the processor at 65%. After the tenth test item T10 has been completely executed, according to the block S55, the test resources corresponding to the tenth test item T10 are released, and the tenth test item T10 is removed from the simulation test set. At this time, the rest resources include the amount of the available memory at 482 MB and the usable occupancy rate of the processor at 90%. The total execution time duration is 70 seconds.

At this time, there is the mutual exclusive relationship between the fourth test item T4 and the sixth test item T6, thus the sixth test item T6 is not satisfied with the first or second conditions, and is not added into the simulation test set.

After the fourth test item T4 has been completely executed, according to the block S55, the test resources corresponding to the fourth test item T4 are released, and the fourth test item T4 is removed from the simulation test set. At this time, the rest resources include the amount of the available memory at 512 MB and the usable occupancy rate of the processor at 100%. The total execution time duration is 85 seconds.

Figure 12:
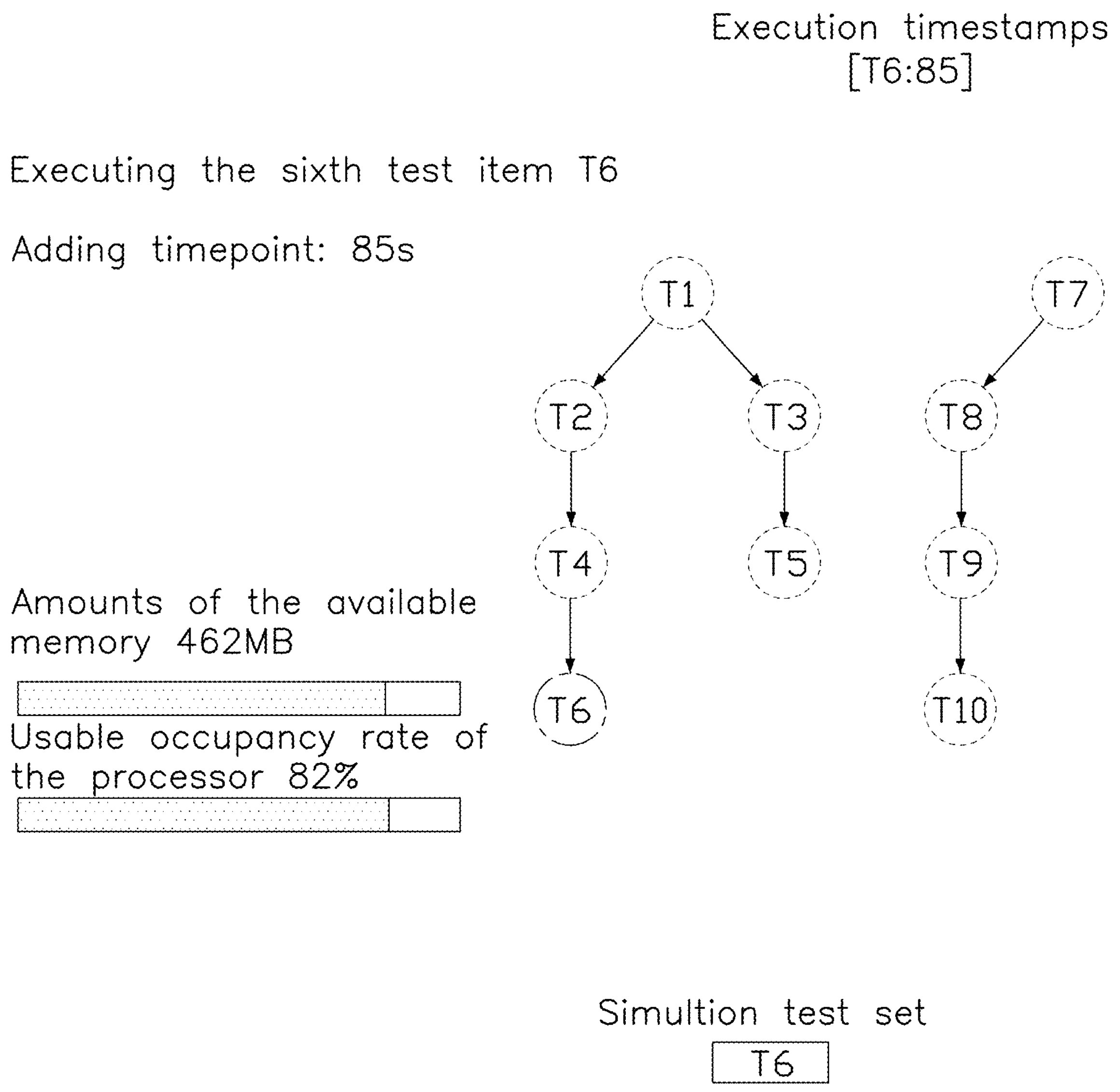

The procedure turns to the blocks S52. As shown in FIG. 12, at this time, the sixth test item T6 is satisfied with the second condition, which is added into the simulation test set and removed from the candidate queue. Besides, according to the block S53, the execution timestamp of the sixth test item T6 is set as the adding timepoint, which is 85 seconds.

While executing the sixth test item T6, the rest resources are updated. The updated rest resources include the amount of the available memory at 462 MB and the usable occupancy rate of the processor at 82%.

After the sixth test item T6 has been completely executed, according to the block S55, the test resources corresponding to the sixth test item T6 are released, and the sixth test item T6 is removed from the simulation test set. At this time, the rest resources include the amount of the available memory at 512 MB and the usable occupancy rate of the processor at 100%. The total execution time duration is 105 seconds. At this time, all of the first to tenth test items T1-T10 have been completely executed.

Thus, by ordering execution all of the plurality of test items, the test sequence is obtained. The obtained test sequence may be represented as [T1:0, T7:0, T2:10; T3:10; T8:10; T5:25; T9:25; T10:45; T4:60; T6:85]. The test execution device 12 executes the corresponding test items based on the execution timestamp in the test sequence, the total execution time duration is 105 seconds. The total execution time duration of executing according to a sequency number of the test items is 190 seconds. Therefore, the method of generating the test sequence may significantly reduce the total execution time duration of all of the plurality of test items, and the efficiency of testing the ECU is improved.

Therefore, the method of generating the test sequence of the ECU provided by the present application and the test system may significantly reduce the total execution time duration of the ECU, an utilization rate of test resources and the efficiency of test are improved.

The foregoing descriptions are example implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for generating a test sequence of an electronic control unit (ECU), used in a test system, the method comprises:

obtaining a plurality of test items of the ECU, and obtaining a dependency relationship and an exclusive situation relationship among the plurality of test items; the dependency relationship comprises a dependent relationship and a depended relationship among the plurality of test items; the exclusive situation relationship comprises an exclusion relationship and a non-mutual exclusive relationship;

outputting the test items to a test monitor device;

receiving the test resources required by each of the plurality of test items, which are obtained by the test monitor device;

generating a test sequence based on the dependency relationship, the exclusive situation relationship, rest available resources of a test execution device, and the test resources required by each of the plurality of test items; and outputting the test sequence to the test execution device;

wherein the test sequence indicates an execution timestamp of each of the plurality of test items, and the execution timestamp indicates an execution starting time of each of the plurality of test items; the test execution device executes the plurality of test items based on the test sequence; the test resources comprise a usable occupancy rate of a processor, an amount of an available memory, and an execution time duration.

2. The method of claim 1, wherein the generating the test sequence based on the dependency relationship, the exclusive situation relationship, and the test resources required by each of the test items comprises:

establishing a directed graph based on the dependency relationship; each node of the directed graph corresponds to one of the plurality of test items; a directed edge of the directed graph represents the dependency relationship between two corresponding nodes; and generating the test sequence based on the directed graph, the exclusive situation relationship, and the test resources required by each of the test items.

3. The method of claim 2, wherein the establishing the directed graph based on the dependency relationship comprises:

confirming at least one test item satisfied with a first condition as a first stage node;

confirming Nth stage nodes based on the dependent relationship; and establishing at least one directed edge between the Nth stage node and the (N−1)th stage node to establish the directed graph;

wherein N is an integer, being larger than 2.

4. The method of claim 3, wherein the establishing the directed graph based on the dependency relationship comprises:

adding all of the nodes in the directed graph into a candidate queue;

adding at least one of the plurality of test items satisfied with the first condition or a second condition into a simulation test set, and removing from the candidate queue;

setting an adding timepoint as the execution timestamp of each of the test items in the simulation test set, and executing all of the test items in the simulation test set;

removing at least one of the test items from the simulation test set, when the at least one of the test items has been completely executed;

wherein the above steps are repeated until all of the plurality of test items have been completely executed; the execution timestamp of each of the plurality of test items are obtained to form the test sequence.

5. The method of claim 4, wherein the at least one of the plurality of test items satisfied with the first condition does not depend on others of the plurality of test items, and non-mutually exclusive with others test items in the simulation test set.

6. The method of claim 4, wherein the second condition comprises: at least one prior test item, which the at least one of the plurality of test items is depended on, has been completely executed, there is non-mutual exclusive relationship between the at least one of the plurality of test items and the others test items in the simulation test set, and the test resources required by the at least one test item is less than or equal to the rest available resources.

7. The method of claim 6, wherein the rest available resources are a difference between total test resources of the test execution device and total test resources required by the test items in the simulation test set.

8. The method of claim 6, wherein the rest available resources are updated after any one of the test items in the simulation test set has been completely executed.

9. A test system used in an electronic control unit (ECU), the test system comprises:

a test schedule device, configured to obtain a plurality of test items of the ECU, obtain a dependency relationship and an exclusive situation relationship among the plurality of test items, output the plurality of test items, and generate a test sequence based on the dependency relationship, the exclusive situation relationship, rest available resources of a test execution device, and test resources required by each of the plurality of test items;

a test monitor device, configured to obtain the test resources required by each of the plurality of test items when receiving the plurality of test items outputted by the test schedule device, and output the obtained test resources required by each of the plurality of test items to the test schedule device;

a test execution device, configured to execute the plurality of test items based on the test sequence outputted by the test schedule device;

wherein the dependency relationship comprises a dependent relationship and a depended relationship among the plurality of test items; the exclusive situation relationship comprises an exclusion relationship and a non-mutual exclusive relationship; the test sequence indicates an execution timestamp of each of the plurality of test items, and the execution timestamp indicates an execution starting time of each of the plurality of test items; the test resources comprise a usable occupancy rate of a processor, an amount of an available memory, and an execution time duration.

10. The test system of claim 9, wherein the test schedule device further establishes a directed graph based on the dependency relationship and generate and generates the test sequence based on the directed graph, the exclusive situation relationship, and the test resources required by each of the plurality of test items; each node of the directed graph corresponds to one of the plurality of test items; a directed edge of the directed graph represents the dependency relationship between two corresponding nodes.

11. The test system of claim 10, wherein the test schedule device further confirms at least one test item satisfied with a first condition as a first stage node, confirms Nth stage nodes based on the dependent relationship, and establishes at least one directed edge between the Nth stage node and the (N−1)th stage node to establish the directed graph; N is an integer, being larger than 2.

12. The test system of claim 11, wherein the test schedule device further adds all of the nodes in the directed graph into a candidate queue; the test schedule device further adds at least one of the plurality of test items satisfied with the first condition or a second condition into a simulation test set and removes from the candidate queue; the test schedule device further sets an adding timepoint as the execution timestamp of each of the test items in the simulation test set and executes all of the test items in the simulation test set; the test schedule device further removes at least one of the test items from the simulation test set, when the at least one of the test items has been completely executed; the test schedule device further repeats at least one of the plurality of test items satisfied with the first condition or a second condition into a simulation test set and removes from the candidate queue, until all of the plurality of test items have been completely executed; the execution timestamp of each of the plurality of test items are obtained to form the test sequence.

13. The test system of claim 12, wherein the at least one of the plurality of test items satisfied with the first condition does not depend on others of the plurality of test items, and non-mutually exclusive with others test items in the simulation test set.

14. The test system of claim 12, wherein the second condition comprises: at least one prior test item, which the at least one of the plurality of test items is depended on, has been completely executed, there is non-mutual exclusive relationship between the at least one of the plurality of test items and the others test items in the simulation test set, and the test resources required by the at least one test item is less than or equal to the rest available resources.

15. The test system of claim 14, wherein the rest available resources are a difference between total test resources of the test execution device and total test resources required by the test items in the simulation test set.

16. The test system of claim 14, wherein the rest available resources are updated after any one of the test items in the simulation test set has been completely execute.

* * * * *